No. 11,767. Reissued Aug. 29, 1899.

J. F. LASH.

DOOR CHECK.

(Application filed Dec. 22, 1897.)

Witnesses
J. E. Camron
J. F. Riggs.

Inventor
Jno. F. Lash.
by C. H. Riches
his attorney

UNITED STATES PATENT OFFICE.

JOHN F. LASH, OF TORONTO, CANADA.

DOOR-CHECK.

SPECIFICATION forming part of Reissued Letters Patent No. 11,767, dated August 29, 1899.

Original No. 578,084, dated March 2, 1897. Application for reissue filed December 22, 1897. Serial No. 663,099.

*To all whom it may concern:*

Be it known that I, JOHN FANNON LASH, of the city of Toronto, in the county of York and Province of Ontario, Canada, have invented certain new and useful Improvements in Door-Checks, of which the following is a specification.

My invention relates to door-checks of the class employed upon doors which swing upon double hinges, and the object of the invention is to provide a simple and effective door-check which will prevent the door to which it is applied from swinging past its center or closed position.

The characteristic features of the invention will be fully described hereinafter and defined in the appended claims.

Figure 1:
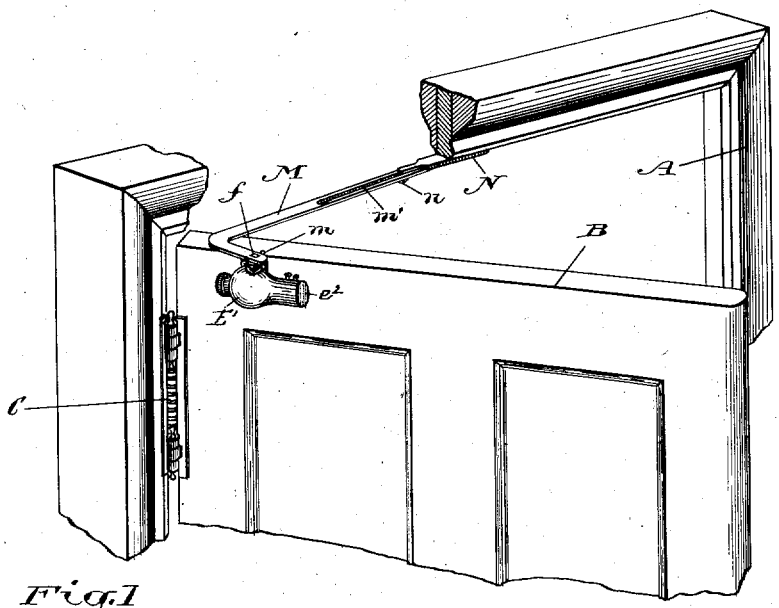
Figure 2:
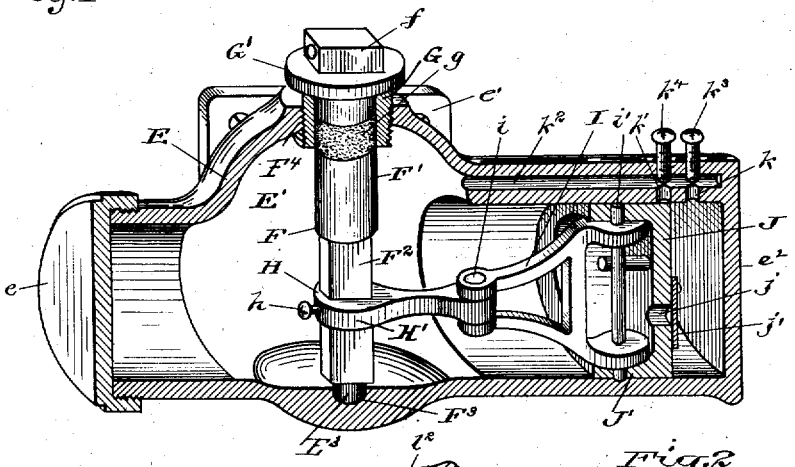
Figure 3:
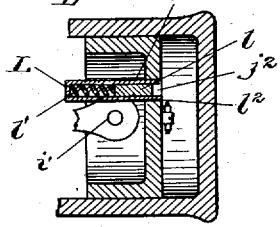

In the accompanying drawings, Figure 1 is a view in perspective of a portion of a door-frame and door with my invention applied thereto. Fig. 2 is a vertical section of the door-check; and Fig. 3 is a horizontal section through a part of the door-check, showing the relief-valve.

The reference-letter A designates the door-frame, B the door, and C one of the double-acting spring-hinges in common use for securing the door to the frame A.

E designates the door-check cylinder, secured to one side of the door near the top edge thereof. The cylinder E is a liquid-containing receptacle and is provided with a spherical enlargement E′, formed at its upper end with a screw-threaded opening $F^4$ and at its bottom with a socket $F^3$. Within the threaded opening $F^4$ is fitted an externally-threaded hollow plug G, through which extends a spindle F, having its lower end $E^3$ reduced and of circular form to fit the socket $F^3$ and rotate therein. The spindle F is provided with a flange G′, which overlaps the plug G, and the upper end of the spindle terminates in a square head *f*. An annular packing *g* is interposed between the spindle and the plug G to prevent the escape of liquid from the cylinder E.

H designates a crank provided with a bored hub H′, through which the spindle passes, the hub being secured to the spindle by a set-screw *h*. The bore of the hub H′ and the body portion of the spindle F, to which the hub is secured, are square in cross-section to facilitate the rotation of the spindle.

J denotes a piston supported within the cylinder E between the spherical enlargement E′ and the outer end $e^2$ of the cylinder. The piston J is provided with an inwardly-projecting horizontal flange J′, to which is secured by a cross-pin *i*′ one end of an arm I, constituting a piston-rod, the pin *i*′, as shown in Fig. 2, passing through the arm and through openings in the flange J′. The opposite end of the arm I is pivotally connected by a pin *i* to the end of a crank H. The piston J is provided with a port *j*, closed by a flap-valve *j*′.

$k^2$ is a longitudinal passage formed in the shell of the cylinder, extending from the spherical enlargement to a point near the outer end of the cylinder and communicating by two ports *k* and *k*′ with the end portion of the cylinder, said ports being controlled by screw-valves $k^3$ and $k^4$.

$j^2$ designates an opening formed in the piston-head to receive the open end of a vent-tube L, the opposite end of which is closed. Within the tube L is fitted a plug *l*, a coil-spring *l*′ being interposed between the closed end of the tube L and the adjacent end of the plug *l*. The tube L is formed with two slots $l^2$, which are normally closed by the plug *l* and which in conjunction with the opening $j^2$ constitute a relief-port for the piston.

N indicates a plate rigidly secured to the under side of the lintel of the frame A and provided at one end with a depending pin *n*.

M is an L-shaped arm, the short arm of which is secured to the head *f* of the spindle F by a pin *m*. The longer member of the arm M rests against the under side of the lintel and is provided with an elongated slot *m*′, through which the pin *n* extends to form a pivot for the arm M and allows said arm to swing laterally on either side of the door-frame, while the slot permits the arm to move longitudinally in either direction. The arm M is preferably made of thin metal, so that it will occupy little space and may freely operate between the lintel and top edge of the door.

The cylinder E is provided with flanges *e*′, provided with screw-holes to facilitate the attachment of the device to the door.

The operation of the parts is as follows: When the door is closed, the piston and ports will be in the position shown in Fig. 2, the crank H and arm I being in alinement and the piston J near the end $e^2$ of the cylinder. When the door is swung in either direction, the arm M is actuated to rotate the spindle F and crank H. The movement of the crank draws the piston J toward the spindle F, and during this movement of the piston the liquid will pass through the port $j$ into the end portion of the cylinder. The reverse or closing movement of the door causes the valve $j'$ to close the port $j$, thus forcing the liquid in front of the piston J through the ports $k$ $k'$ and passage $k^2$ and into the spherical enlargement E'. When the piston has been moved to cover the port $k'$, the liquid in front of the piston is passing through the port $k$, which, being its only means of escape, retards the movement of the piston and causes the door to move very slowly as it approaches its closed position and to stop exactly on the center line of the frame. The action of the piston is the same in both directions of movement of the door, as the slotted arm M swings in conjunction with the door and rotates or partially rotates the spindle to actuate the crank and through it the piston. Should it be desired when the door is open in one direction to close it more quickly than it would naturally close or open to permit a person to pass through it in the opposite direction, it may be done, as the liquid in front of the piston having a greater pressure exerted upon it will force the plug $l$ backward to allow the liquid to pass through the slots $l^2$ and relieve the port $j$ and provide the check with a free retrograde movement.

I claim as my invention—

1. The combination with a door swung on double-acting spring-hinges, of a liquid door-check having a piston, piston-rod, and a rotatable operating-spindle, an arm secured at one end of said rotatable spindle, arranged to cross over the top edge of the door and underneath the lintel of the door-frame, and a longitudinally self-adjusting connection between the arm and the lintel, as and for the purpose specified.

2. The combination with a door swung on double-acting spring-hinges, of a liquid door-check having a central operating-spindle suitably journaled in the top and bottom of the chamber and suitably connected to a piston of an arm secured to the top of the spindle at one end and having the other end slotted and designed to be in alinement with the door when closed and a pin connecting it to the lintel through the slot, as and for the purpose specified.

3. The combination with a door swung on double-acting spring-hinges, of a liquid door-check an arm connecting the spindle of same to the lintel, a piston also suitably connected to the spindle by a jointed arm, and a plurality of ports extending from the outer end of the cylindrical end of the liquid-chamber into a separate passage-way, and means in the head of the piston for allowing the liquid to escape into the other portion of the chamber upon an extra pressure being exerted upon the door in the same direction to which it is closing, as and for the purpose specified.

4. The combination with the door swung on double-acting spring-hinges, of a liquid door-check, an arm connecting the spindle of same to the lintel, a piston also suitably connected to the spindle by a jointed arm, and a plurality of ports extending from the outer end of the cylindrical end of the liquid-chamber into a separate passage-way, and a sleeve provided with slots, and an open end in the head of the piston, and a spring-pressed plug held in such sleeve, so as to normally close the slots, as and for the purpose specified.

5. A mechanism to control the closing movement of a door swung on double-acting hinges, embracing in the construction a door-check, provided with a piston, piston-rod and a rotatable operating-spindle, and a pivoted arm adapted to swing on either side of the door-frame in conjunction with the door, and operate the door-check to control the closing movement of the door, substantially as specified.

6. A mechanism to control the closing movement of a door swung on double-acting hinges, embracing in its construction a door-check, provided with a piston, piston-rod, a liquid-chamber, and an operating-spindle journaled within said chamber, and an arm arranged to swing on either side of the door-frame in conjunction with the door to actuate the door-check, substantially as specified.

7. A mechanism for controlling the closing movement of a double-acting door, consisting of a door-check connected to the door, and provided with a piston, piston-rod, and a rotatable operating-spindle, and an arm pivotally and self-adjustably connected to the door-frame and pivotally connected to the door-check, adapted to swing with the door on either side of the door-frame, substantially as specified.

8. A door-check embracing in its construction a liquid-chamber, a rotatable shaft journaled in the liquid-chamber, a crank carried by the shaft, a piston-valve movable in the liquid-chamber, a pivoted connection between the piston and crank, a valve-controlled port through the piston escape port or ports from the liquid-chamber in front of the piston, a passage-way communicating with the escape port or ports and the liquid-chamber at the rear of the piston, and a supplemental safety-port through the piston, normally closed by a spring-controlled valve, substantially as specified.

9. A means for controlling the closing action of a double-acting door, embracing in its construction a bell-crank arm, connected pivotally to the lintel of the door-frame and arranged to be projected forward and retracted by the opening and closing movement of the door, and a door-check attached to the door, and operated by the arm during the movement of the door, substantially as specified.

Toronto, Canada, December 9, A. D. 1897.

JOHN F. LASH.

In presence of—

MILLER LASH,

C. H. RICHES.